United States Patent [19]
Williams

[11] 3,882,582
[45] May 13, 1975

[54] ADJUSTABLE BIT HOLDER

[76] Inventor: Thurston V. Williams, Wilton, N.H. 03086

[22] Filed: Apr. 18, 1973

[21] Appl. No.: 352,101

[52] U.S. Cl. .............................................. 29/105 R
[51] Int. Cl. .................................................. B26d 1/12
[58] Field of Search .................................. 29/105 R

[56] References Cited
UNITED STATES PATENTS

| | | | |
|---|---|---|---|
| 1,681,675 | 8/1928 | Mille | 408/197 X |
| 3,027,624 | 3/1962 | Payne | 29/105 |
| 3,058,198 | 10/1962 | Williams | 29/105 X |
| 3,270,396 | 9/1966 | Williams | 29/105 |
| 3,555,644 | 1/1971 | Owen | 29/105 |
| 3,574,251 | 3/1971 | Corti | 29/105 |

Primary Examiner—Andrew R. Juhasz
Assistant Examiner—W. R. Briggs
Attorney, Agent, or Firm—James H. Grover

[57] ABSTRACT

A rotary insert bit tool holder has a peripheral recess in which the bit is clamped with a wedge and a lock screw directed inwardly of the recess forcing the wedge frictionally apart against one side of the recess. A lifting jack engages under the bit and is adjusted outwardly of the recess by a screw threaded through the jack and against the bottom of the recess.

6 Claims, 6 Drawing Figures

ADJUSTABLE BIT HOLDER

BACKGROUND OF THE INVENTION

Tungsten carbide insert bits for cutting metal are typically secured to a tool holder such as a rotating carrier or wheel, with a cutting or other wearing edge projecting from the wheel. The bits must be securely mounted on the wheel to withstand the great forces of metal cutting, and at the same time must be extremely precisely located radially or axially of the wheel, and yet must adjust as the bits wear or dull or are resharpened. One way of securely yet adjustably mounting bits is described in my U.S. Pat. No. 3,501,822, granted Mar. 24, 1970. Therein a wedge urged by a lock screw jams the bit with great holding force against the wall of a recess in the wheel to prevent the bit being pushed back in the recess. The second screw threaded through the wedge at right angles to the lock screw draws the bit laterally of the wedge to adjust the bit after the lock screw is loosened.

The object of the present invention is to permit precise cut locating adjustment of the bit while it is still securely clamped in its tool holder, and yet to prevent the cutting forces from pushing the bit from precise cutting location.

STATEMENT OF INVENTION

According to the invention a tool holder for a bit with a wearing edge comprises a holder body having a bit recess with a bottom and side, a lock for laterally clamping the bit frictionally with respect to the side, a lifter having an abutment for engaging the bit opposite the wearing edge positively to oppose movement of the bit inwardly of the recess and move the bit away from the bottom along the side, and a lifter screw engaging the recess bottom and lifter, the screw being adjustable to urge the bit and wearing edge outwardly of the recess against the clamping friction of the lock.

DRAWING

DESCRIPTION

Figure 1:
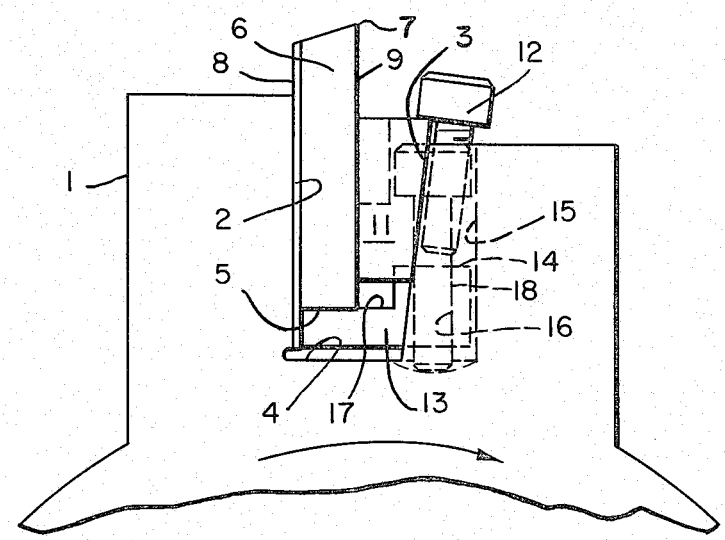
FIG. 1 is a fragmentary side elevation of a wheel with a wedge and lifter for adjustably mounting a cutting bit.
Figures 2, 3, 5:
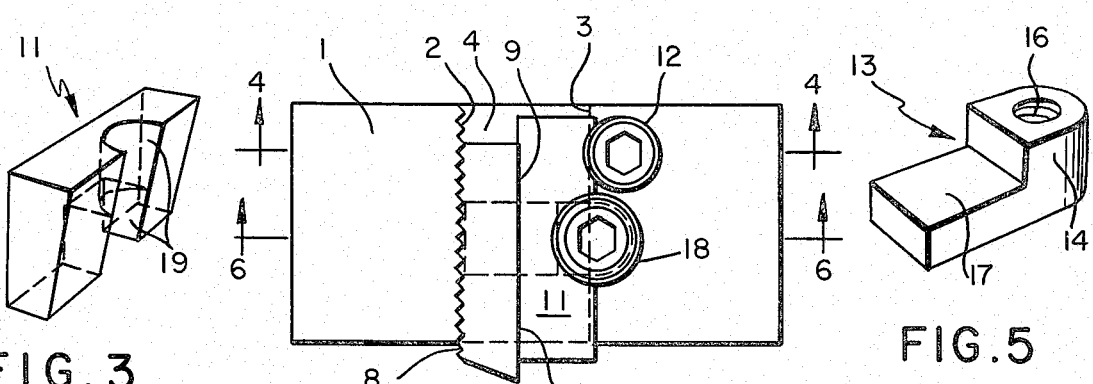
FIG. 2 is a plan view of the wheel.
FIG. 3 is an isometric view of the wedge of FIG. 1.
FIG. 5 is an isometric view of the lifter of FIG. 1.

As shown in FIGS. 1 and 2 a rotary tool holder wheel 1 has a bit recess with a serrated sidewall 2, an inwardly converging wall 3 and a bottom 4. Each bit 6 has at least one cutting edge 7, a serrated face 8 matching the serrations on wall 2, and an unserrated face 9. A lock or clamping wedge 11 (FIG. 3) fitting between the unserrated bit face 9 and recess wall 3 is forced by a lock screw 12 inwardly of the recess toward the bottom 4. The wedge, which has an included angle of 10° for example, thereby clamps the bit in the socket against radial displacement by centrifugal forces, while the interfitting serrations on the bit and recess wall 2 prevent movement transversely of the serrations.

Figures 4, 6:
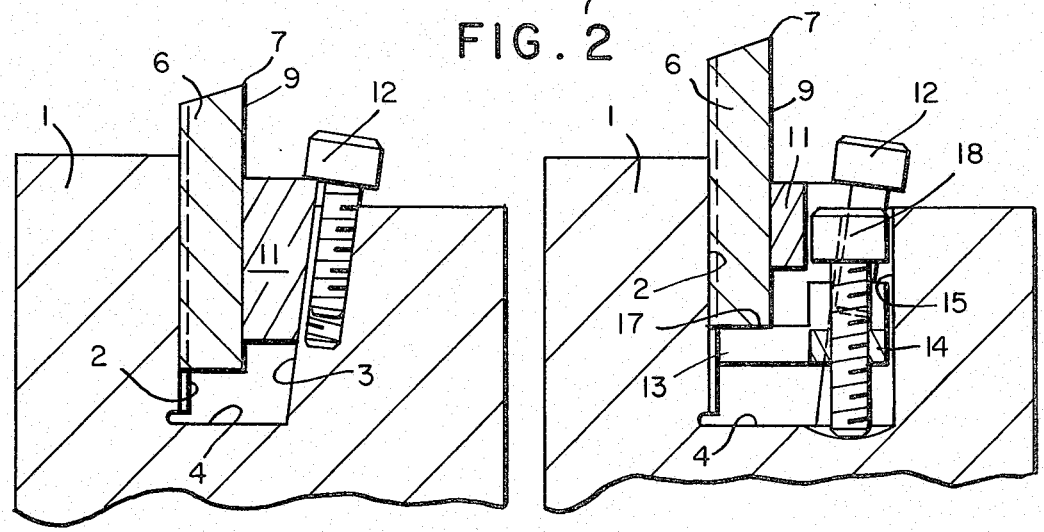
FIG. 4 is a section through the wedge on line 4—4 of FIG. 2.
FIG. 6 is a section through the lifter on line 6—6 of FIG. 2.

Fitting in the recess with clearance from the recess walls 2 and 3 is a lifter jack 13 (FIG. 5). The lifter has a collar 14 for which a clearance channel 15 is provided parallel to the serrated recess wall 2. The collar has a threaded bore 16 for an adjusting screw 18, and a stirrup-like abutment 17 engaging the under edge 5 opposite the cutting edge 7 of the bit 6. As shown in FIG. 3 the wedge or lock 11 has a cutaway portion 19 providing clearance for movement of the collar 14 and stirrup 17 of the lifter jack 13 from its radially inward position shown in FIG. 1 to an outward position shown in FIG. 6.

In use the bit is inserted in the holder against the serrated recess wall 2 and held inwardly of its desired position by the wedge lock 11. When the lock screw or actuator 12 for the wedge 11 is turned it exerts a generally inward force and movement of the wedge into the recess, clamping the bit against the serrated recess wall 2 frictionally. The lifter screw 18 is then turned to jack the bit outwardly to its precise position.

In contrast with previous bit holders such as shown in the aforementioned U.S. Pat. No. 3,501,822, with the present bit holder it is not necessary to loosen the wedge screw 12 prior to precise adjustment of the bit with the lifter screw 18. Partly because of the greater than normal wedge angle (e.g. 10° versus the normal 5°), and partly because the inward wedge and wedge screw action is opposite to the outward lifter and bit movement, the frictional clamping force of the wedge is somewhat relieved during adjustment although it is completely adequate to secure the bit against outward movement in use. Eliminating the need to loosen the wedge screw insures that the precise lifting adjustment will not be disturbed by relocking the wedge after adjustment as was hitherto the case. Moreover because the wedge or actuator screw 12 and lifter screw act in substantially parallel directions their heads may be located close together exposed for access at the same outer opening of the bit recess.

In addition to effecting precise adjustment of the bit with respect to the desired cutting radius the jack 13 also backs up the bit against the great cutting forces which tend to push the bit toward the bottom 4 of the recess. In comparison with prior tool holders which rely on great wedging force to prevent inward dislocation of the bit, in the present holder the jack 13 by virtue of its adjusting screw 18 being seated on the bottom 4 of the wheel body 1 positively opposes inward cutting forces.

Thus the jack accomplishes two purposes, namely precise adjustment of the bit to the desired cutting radius, and maintenance of the bit in precise location during cutting.

It should be understood that the present disclosure is for the purpose of illustration only and that this invention includes all modifications and equivalents which fall within the scope of the appended claims.

I claim:

1. A tool holder for a bit with a wearing edge comprising:

a holder body having a bit recess with a bottom wall and a side wall, a lock for laterally clamping the bit frictionally with respect to the side, the interengaging face of the bit and said recess side wall being parallel to the interengaging faces of the bit and said lock to allow sliding movement of the bit outwardly of the recess between the lock and side, and the lock including an actuator acting inwardly of the recess and comprising a wedge having an angle substantially greater than 5° and preferably 10°, a lifter having an abutment for engaging the bit opposite the wearing edge positively to oppose movement of the bit inwardly of the recess, and move the bit away from the bottom along the side, and a lifter screw engaging the recess bottom and lifter, the screw being adjustable to urge the bit and wearing edge outwardly of the recess against the clamping friction of the lock, the lifter screw acting substantially in a direction opposite to the actuator so that turning the screw moves the lifter and bit in relief of the actuator force.

2. A tool holder according to claim 1 wherein the lock includes an actuator, the actuator and lifter acting in substantially parallel directions so that turning the screw moves the lifter in relief of the actuator force.

3. A tool holder according to claim 2 wherein the lock and actuator comprise a wedge and a screw disposed to act inwardly of the recess, said lifter and screw are disposed to act outwardly of the recess.

4. A tool holder according to claim 2 wherein the actuator and lifter screw extend from and are exposed at the same outward opening of the recess.

5. A tool holder according to claim 1 wherein the lifter screw is threaded in and through the lifter.

6. A tool holder for a bit with a cutting edge and an opposite edge comprising:

a holder body having a bit recess opening into the body with a bottom and opposed side walls, a wedge having tapered opposite faces respectively bearing on one side wall and on the bit for clamping the bit frictionally against the other wall, the wedge having an angle substantially greater than 5° and preferably 10°, a wedge actuator screw threaded in the holder body toward the recess bottom and holding on the wedge in clamping position;

a lifter movable in the recess away from the bottom and having an abutment for engaging the bit edge opposite the cutting edge, and a lifter screw threaded in and through the lifter into engagement with the recess bottom, such that turning the lifter screw urges the bit outwardly of the recess against the clamping friction and in relief of the clamping force of the wedge screw.

* * * * *